UNITED STATES PATENT OFFICE 2,243,329

PROCESS FOR BREAKING PETROLEUM EMULSIONS

Melvin De Groote, University City, and Charles M. Blair, Jr., Webster Groves, Mo., assignors to Petrolite Corporation, Ltd., Wilmington, Del., a corporation of Delaware No Drawing. Application June 27, 1940, Serial No. 342,727

11 Claims. (Cl. 252—341)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

We have found that the particular chemical compounds or reagents herein employed as demulsifiers may also be used for other purposes, for instance, as a break inducer in doctor treatment of the kind intended to sweeten gasoline. See U. S. Patent No. 2,157,223, dated May 9, 1939, to Sutton. Chemical compounds of the kind herein described are also of value as surface tension depressants in the acidization of calcareous oil-bearing strata by means of strong mineral acid, such as hydrochloric acid. Similarly, some of said compounds are effective as surface tension depressants or wetting agents in the flooding of exhausted oil-bearing strata.

As to using compounds of the kind herein described as flooding agents for recovering oil from subterranean strata, reference is made to the procedure described in detail in co-pending applications for patents Serial Nos. 322,534, 322,535, and 322,536, filed March 6, 1940, by Melvin De Groote and Bernhard Keiser. As to using compounds of the kind herein described as surface tension depressants in combination with mineral acid for acidization of oil-bearing strata, reference is made to co-pending applications for patents Serial Nos. 322,537 and 322,538, filed March 6, 1940, and 323,418, filed March 11, 1940, by Melvin De Groote and Bernhard Keiser.

We have discovered that the basic types of acylation derivatives of totally or partially oxyalkylated polyamines containing at least three amino nitrogen atoms, are particularly effective as demulsifiers for oil field emulsions. Polyamines, which are readily available as raw materials, include diethylene triamine, tetraethylene pentamine, and triethylene tetramine. These are commonly referred to as ethylene polyamines, and are considered as members of the broad class of alkylene polyamines. Ordinarily the word "polyamine" is employed to include diamines, as well as amines having three or more nitrogen atoms. Insofar that all the compounds herein contemplated are characterized by the fact that the polyamines must contain more than two nitrogen atoms, for sake of simplicity and to avoid burdensome repetition, we will use the word "polyamine" both in the specification and in the hereto appended claims to mean polyamines having three or more nitrogen atoms, thus eliminating diamines from consideration, and eliminating from repeated use such burdensome language as "polyamine containing at least 3 amino nitrogen atoms."

The manufacture of such polyamines is well known. For instance, see U. S. Patent No. 1,951,992, dated March 20, 1924, to Perkins, and U. S. Patent No. 2,049,467, dated August 4, 1936, to Mnookin. As is well known, such compounds can be obtained by reactions involving reactants other than ethylene dichloride; for instance, propylene chloride, or any higher alkylene dichloride may be employed.

Furthermore, as is well known, the formation of such polyamino compounds is not dependent upon the use of ammonia, but may employ a primary amine. Obviously, the reaction may also employ a secondary amine; but the compound obtained solely from secondary amines is valueless, because it cannot be acylated by an amidification reaction so as to yield an amide. Similarly, it cannot enter into an oxyalkylation reaction of the kind subsequently described. One may, of course, employ mixtures of ammonia and primary amines. A secondary amine may be used in connection with ammonia or primary amines. As to other suitable reactants which may be substituted for ethylene dichloride in the manufacture of such polyamines, one may include the following: propylene dichloride, butylene dichloride, amylene dichloride, etc.

For the sake of simplicity we will limit our present description of the polyamine raw material to the particular species derived from polyamines obtained by reactions involving ethylene dichloride. Broadly speaking, this class may be typified by the following formula: $NH_2.C_2H_4.(C_2H_4.NH)_x.NH_2$ where $x$ is a whole number, varying from one to 10, and preferably 2 to 4. The best and most effective demulsifiers are obtained when $x$ equals 2 or 3.

The compounds herein contemplated for use as demulsifiers, as has been previously pointed out, are acylation derivatives of hydroxylated polyamines obtained conveniently by various procedures, and particularly, by the conversion of polyamines of the kind above described into hydroxylated derivatives, as, for example, by oxyethylation, followed by subsequent acylation, i. e., formation of amides, esters, or ester amides. The acyl group which must be present at least to the extent of at least a single occurrence in ester or amide form, may be derived from any suitable high molecular weight carboxy acid.

The expression "higher molecular weight carboxy acids" is an expression frequently employed to refer to certain organic acids, particularly monocarboxy acids, having more than six carbon atoms, and generally less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different source and are different in structure, but can be included in the broad generic term previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least 8 carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oil, whale oil, shark oil, and other fish oils, teaseed oil, partially or completely hydrogenated animal and vegetable oils, such as those mentioned; hydroxy and alpha-hydroxy higher carboxylic, aliphatic and fatty acids, such as dihydroxystearic acid, dihydroxy palmitic acid. dihydroxybehenic acid, alphahydroxy capric acid, alphahydroxystearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as benzoic acid, Twitchell fatty acids, naphthoic acid, carboxydiphenyl pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

In all instances the reactant employed to introduce an acyl radical from a higher molecular weight carboxy acid need not be the acid itself, but may be the ester, anhydride, amide, or any other suitable form.

Broadly speaking, compounds of the kind herein contemplated as demulsifiers can be made in any number of ways, particularly by the employment of four general procedures: (a) conversion of the polyamine into a hydroxylated compound with subsequent acylation; (b) conversion of the polyamine of the kind above described into an amide with subsequent hydroxylation in any suitable manner; (c) simultaneous hydroxylation and acylation of a polyamine of the kind described; and (d) re-acylation of an oxyalkylated amide as subsequently described. Our preference is to use either one of the first two procedures indicated, or else, the last indicated procedure, for reasons which will become apparent, in view of what is said subsequently.

It is well known that if an amine is treated with an alpha-beta unsaturated alkylene oxide, or its equivalent, such as ethylene oxide, propylene oxide, glycid, epichlorhydrin, and the like, amino hydrogen atoms are replaced by hydroxyalkyl groups or the equivalent. We have found that glycid, ethylene oxide, and propylene oxide are the most desirable reagents for such oxyalkylation reactions; and we particularly prefer to employ ethylene oxide. Ethylene chlorhydrin or glycerol chlorhydrin may be used in place of ethylene oxide or glycid. Such procedure is less advantageous, because in the majority of instances it is desirable to convert the amine hydrochloride or its equivalent in the corresponding base or basic compound by means of alkali, thus necessitating an added step, in comparison with the use of the oxide.

The conversion of amines, whether monoamines, diamines, or polyamines, into a hydroxylated derivative by means of ethylene oxide or the like, is well known. For instance, see British Patent No. 364,104, of 1932, to Johnson, in behalf of I. G. Farbenindustrie, A.-G. Note Example 1. By treatment with ethylene oxide, one can readily obtain derivatives of the type in which amino hydrogen atoms are successively replaced by oxyalkyl radicals, for instance, a hydroxyethyl radical; and further, oxyalkylation can be employed to introduce long chain oxyalkylene linkages, in which oxygen appears a large number of times, particularly four times or more. Such type of material is not herein contemplated. In the present instance reference to the introduction of an oxyalkyl group is limited to the instances in which the carbon atom chain is uninterrupted, or, in any event, not interrupted more than once by oxygen atoms. The object is to eliminate from consideration certain types of compounds which are concerned with functional properties, by virtue of the presence of the re-occurring ether linkage. Such oxyalkylation is usually conducted under pressure and in presence of a small amount of alkali as a catalyst.

If one examines diethylene triamine as an example, it is to be noted that all four primary amino hydrogen atoms and the single secondary amino hydrogen atom may be replaced by a hydroxyethyl radical. Assuming that such is the case, i. e., that one obtains pentahydroxyethyl diethylene triamine, it is obvious that the acylation thereof, by means of a high molecular carboxy acid or its equivalent, as described, will result in the formation of an ester and only an ester. On the other hand, if one obtains the bis-hydroxyethyl derivative of diethylene triamine and acylates the same with one or two moles of the selected high molecular carboxy acid, then one may obtain either the amide type or the ester type. However, if such acylation is conducted by three moles of the high molecular carboxy acid or its equivalent, then one is most likely to obtain the mixed type, although theoretically one could introduce all three acyl groups in the amido form. However, in many instances the hydroxyl hydrogen atom appears more readily replaced than the amino hydrogen atom; and for this reason one would obtain both types. In any event, the introduction of four acyl groups invariably and inevitably results in the formation of the mixed amide ester type. On the other hand, if one obtained the amide by direct reaction between diethylene triamine and a high molecular weight carboxy acid, and then subjected such amide to reaction with ethylene oxide, one obviously would obtain the amide type free from the ester type. Such procedure is well known. See British Patent No. 337,368, of 1931, to Carpmael, in behalf of I. G. Farbenindustrie, A.-G. However, in the present instance one employs a smaller amount of ethylene oxide than indicated in Example 4 of said patent, insofar that it is not the intention to produce a long chain having recurring ether linkages.

Another procedure, of course, depends on simultaneous oxyalkylation and acylation; for instance, the polyamine of the kind described and a suitable high molecular weight carboxy acid of the kind indicated may be subjected to reaction with an alkylene oxide, such as ethylene oxide. The objection to such procedure is that one obtains a mixture of products which may not be predetermined as readily as when other procedures are employed. Furthermore, one may form either as an intermediate or as a final product, an ester of the selected high molar carboxy acid, with the result that the ester may only react slowly with the polyamine and that, in any event, part of the alkylene oxide may be present in the final product, in the form of an alcohol without being profitably utilized. In the main, our preference is to employ relatively high boiling polyamines and subject the same to reaction with ethylene oxide under pressure at approximately 180–220° C. in presence of a small amount of alkali; or better still, in the presence of approximately one percent of sodium methylate. The hydroxylated polyamines so obtained are acylated in the manner indicated, and as exemplified by subsequent examples.

The second procedure, which is particularly desirable when one is interested in obtaining the amide type, is to form the acylated amide and then subject the same to reaction with ethylene oxide under substantially the same conditions just described in regard to the hydroxylation, or rather, oxyalkylation of polyamines. The final procedure mentioned will be illustrated in the series of examples which appear subsequently.

It is to be understood that the particular acylated polyamines of the kind herein contemplated as demulsifying agents must have present at least one basic amino nitrogen atom, and preferably, at least two basic amino nitrogen atoms. It is known that nitrogen atoms which are directly linked to an aryl radical, or an acyl radical, are substantially non-basic in character, and ordinarily do not show any marked solubility in acid. Actually, arylamines in general show weakly basic properties; but for the present discussion they may be considered as substantially non-basic. On the other hand, amino nitrogen atoms not directly linked to an acyl group and not directly linked to an aryl radical may be either strongly basic or mildly basic. Mildly basic radicals are characterized by freedom from directly linked aryl and acyl radicals, but are characterized by being linked directly to a hydroxyhydrocarbon radical, such as an alkylol radical, or an esterified alkylol radical or their equivalents, including morpholine radicals. A strongly basic amino nitrogen atom, in many instances, may be characterized by being of the following type:

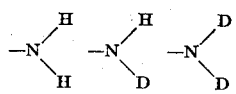

in which D represents a non-aryl hydrocarbon radical or acylated oxyhydrocarbon radicals. Furthermore, DD jointly is not intended to represent a morpholine nucleus in those instances where the amino nitrogen atom, as combined in the radical NDD, is intended to be a strongly basic amino nitrogen atom. These statements apply only in respect to illustrating a strongly basic amino nitrogen atom. This does not preclude DD jointly in the combination NDD from representing a morpholine nucleus in such instances where the combination is only intended to supply a mildly basic type, as described.

However, amino nitrogen atoms which are considered basic in the present instance may be either the strongly basic type or the mildly basic type. Our preference is to employ the type in which there is present at least one strongly basic amino nitrogen atom. Needless to say, if one starts with a polyamine which is completely hydroxylated, i. e. all the amino hydrogen atoms have been converted into hydroxyalkyl radicals, then one is limited to the mildly basic type. For this reason it is our preference to employ only partial oxyalkylation in respect to the polyamines, either prior to acylation, or after amidification.

It is not intended to limit the compounds herein described to derivatives in which amino hydrogen atoms are replaced only by acyl radicals or hydroxyalkyl radicals. For example, the polyamines themselves may contain alkyl groups or the equivalent. This means that instead of starting with a polyamine, one might start with an alkylated polyamine. It has been previously pointed out that the polyamines may be indicated by the following formula:

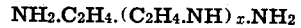

in which $x$ is a small whole number varying from 1 to 10 and preferably from 2 to 4. Dependent upon the method of manufacture, a polyamine may contain an alkyl radical as produced.

Previous reference has been made to the production of polyamines suitable for use as raw materials from primary or secondary amines, as well as from ammonia. Amines so obtained may have an alkyl radical present without necessity of a separate step for introducing such alkyl radicals. For instance, the reaction involving an alkylene dichloride on one hand and a mixture of a secondary amine and ethylene diamine on the other hand, would produce a mixture of compounds, part of which would consist of a polyamine of the kind contemplated as a raw material in the present instance; and such polyamine would be additionally characterized by the presence of at least one amino nitrogen atom connected to two alkyl radicals.

However, if desired, the polyamines as available can be alkylated in the manner commonly employed for alkylating ordinary amines, i. e., monoamines or diamines. For instance, alkylated products may be derived by reaction between alkyl chlorides, such as methyl chloride, propyl chloride, butyl chloride, amyl chloride, cetyl chloride, octadecyl chloride, and the like, in conjunction with the selected polyamine. Such reaction products result in the formation of hydrochloric acid, and the resultant product consists of an amine hydrochloride. The conventional method for conversion into the base is to treat with dilute caustic solution. Alkylation is not limited to the introduction of an alkyl group; but as a matter of fact, a radical may be introduced characterized by the fact that the carbon atom chain is interrupted at least once by an oxygen atom. In other words, alkylation may be accomplished by compounds which are essentially alkyloxyalkyl in chlorides, as, for example, the following:

$CH_3OC_2H_5Cl$  $C_2H_5OC_2H_5Cl$
$C_2H_4OC_3H_7Cl$  $C_6H_{13}OC_6H_{13}Cl$

Similarly, chlorhydrins are available from polyglycerol, such as diglycerol and some polyglycols, such as diglycols, which are characterized by the fact that the carbon atom chain is interrupted more than once by oxygen. The compounds obtained by the introduction of such radicals which contain a carbon atom chain interrupted at least once by oxygen, are very similar to the compounds obtained by the introduction of alkyl groups. Therefore, for the sake of brevity, reference in the hereto appended claims to an alkyl group is intended to include within such expression oxyhydrocarbon radicals of the kind just described, to wit, those in which the carbon atom chain is interrupted at least once by oxygen; but it is not intended to contemplate compounds of the type in which the carbon atom chain is interrupted more than twice by an oxygen atom.

As a matter of common knowledge, reactions involving ammonia and an alkylene dichloride probably go through an intermediate stage which involves a formation of an aminoalkyl halide. As a result, one has a procedure whereby, instead of substituting an alkyl radical for an amino hydrogen atom, one can substitute an aminoalkyl radical. For analogous reactions see U. S. Patent No. 2,014,077, dated September 10, 1935, to Wilson. Thus, what has been previously stated may be modified in the following respect: D, in addition to being an alkyl radical, may also be an aminoalkyl radical.

It is not intended to include the type of compound in which there are other amino nitrogen atoms which are non-basic in character, such as a radical derived from an arylamine. There may be present non-basic amido radicals other than the kind described, to wit, amido radicals derived, for example, from an acid having less than 6 carbon atoms, as, for example, acetic acid, butyric acid, and the like.

However, regardless of the presence or absence of such other radicals, the acylated polyamine must always contain at least three amino nitrogen atoms, the word "amino" being employed in the broad sense in this instance to include both amino nitrogen atoms and amido nitrogen atoms; and at least one amino nitrogen atom must be of the basic type; and preferably, there should be present at least two amino nitrogen atoms of the basic type.

Summarizing what has been said, the basic type acylated polyamine of the kind herein contemplated for use as a demulsifier may be indicated by the following type formula:

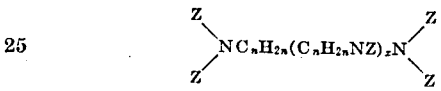

in which $n$ represents a small whole number varying from 2 to 10; $x$ is a small whole number, such as one or more, as previously indicated; and Z is H, RCO, R'CO, or D, in which RCO represents an acyl radical derived from a higher molecular weight carboxy acid and must occur at least once; and R'CO is an acyl radical derived from a lower molecular weight carboxy acid having six carbon atoms or less; D is alkyl, hydroxyalkyl, aminoalkyl, or acylated hydroxyalkyl (i. e., an acyloxyalkylene radical) in which the acyl group may be RCO or R'CO; and the acylated derivative is further characterized by the fact that RCO oxyalkylene radical must occur at least once; or in the absence of such occurrence, there must be at least one occurrence of RCO concurrently with at least one occurrence of a hydroxyalkyl radical; and in any event, the compound must be of the basic type, as has been previously indicated; and where DD appears attached to the same amino nitrogen atom, it may represent a morpholine nucleus, in those instances where the combination NDD furnishes only a mildly basic type, as differentiated from those instances where the radical NDD is required to furnish a strongly basic type.

We have found that the most desirable demulsifiers are obtained by the use of detergent-forming acids of the kind described; and we have particularly found that fatty acids represent the most desirable type of detergent-forming acids. More particularly, the hydroxylated fatty acids represent the most desirable type of fatty acids; and the most desirable specific member of the hydroxylated type is ricinoleic acid.

*Amide Example 1*

283 parts of stearic acid amide are heated with 438 parts of triethylene tetramine for 10 hours to about 130° C. until a test portion is soluble in diluted hydrochloric acid; at the end of the reaction the pressure is preferably lowered to about 15 mm. Hg. Thereby 380 parts of a product probably corresponding to the formula $C_{17}H_{35}CO.NH(C_2H_4NH)_2C_2H_4NH_2$ (monostearyl triethylene tetramine) are obtained.

Amide Example 2

281 parts of oleic acid amide yield with 584 parts of triethylene tetramine, when heated for 10 hours at about 130° C., 400 parts of a product which is soluble in diluted hydrochloric acid, and probably corresponds to the mon-oleyl triethylene tetramine.

Amide Example 3

283 parts of stearic acid amide are heated in the same way as described in Examples 1 and 2 with 400 parts of mixture of polyalkylene polyamines obtainable by heating ethylene dichloride with ammonia under pressure and removing any ethylene diamine formed during the latter reaction. After distilling the excess of bases under reduced pressure, 430 parts of a paste are obtained which is soluble in diluted acids.

Amide Example 4

300 parts of ricinoleic acid amide yield with 400 parts of a mixture of bases according to Example 3, when heated to about 8 hours to 150–160° C., 450 parts of a mixture of acylated bases which is easily soluble in diluted acetic or hydrochloric acid.

Amide Example 5

From 300 parts of ricinoleic acid amide and 400 parts of a mixture of polyalkylene polyamines according to Examples 3 and 4, by heating for several hours to 150° C., simultaneously passing a current of dry air free from $CO_2$, and finally removing the excess of bases partly by distilling under reduced pressure and partly by washing with water, there are obtained 430 parts of a mixture of polyalkylene polyamines which is acylated by the radical of ricinoleic acid.

Amide Example 6

100 parts by weight of olive oil and 100 parts by weight of diethylenetriamine are heated to about 180–200° C. until a test portion of the reaction mixture is soluble in dilute hydrochloric acid. After distilling off the excess of diethylenetriamine, advantageously under reduced pressure, there remains a strongly viscous mass, the hydrochloric acid solution of which has great foam-forming properties.

A similar product is obtainable by heating free oleic acid with a large excess of diethylenetriamine under the same conditions.

Amide Example 7

310 parts by weight of the ethylester of oleic acid are heated with 286 parts by weight of triethylene tetramine at about 160° C. for 12 hours when a homogeneous solution is formed; the alcohol formed and the excess of triethylenetetramine are distilled off. The residual reaction product forms a brown oil, which is difficultly soluble in water and readily soluble in alcohol, benzene and dilute hydrochloric acid.

A quite similar product is obtainable by heating free oleic acid with an excess of triethylenetetramine to about 180–200° C. and distilling off the excess of triethylenetetramine under reduced pressure.

Amide Example 8

200 parts by weight of olive oil are heated at 180–200° C. with 300 parts by weight of a mixture of bases, which is obtained by the action of ammonia on ethylene chloride at 80–120° C. under pressure of 10 atm. and after distilling off the ethylene diamine said mixture of bases boiling at about 15 mm. mercury between 90 and 300° C. When a test portion of the reaction product is smoothly soluble in dilute hydrochloric acid the water formed and the excess bases are distilled off under reduced pressure and a yellowish brown oil is obtained, a solution of which in dilute hydrochloric acid can be used as a washing or wetting agent.

Amide Example 9

350 grams of monostearin and 300 grams of triethylenetetramine are heated together at 180–200° C. for 3 to 4 hours and then the displaced glycerine and the excess triethylenetetramine were washed out with water and the resulting product dried.

Amide Example 10

In the prior examples tetraethylene pentamine is substituted for the amines employed in the prior examples by using a suitable molecular equivalent but without increasing the amount of fatty acid compound employed.

Amide Example 11

Purified naphthenic acids derived from Gulf Coast crudes are employed in various examples preceding.

Amide Example 12

Carboxy acids derived from oxides of Pennsylvania crude oil and having approximately 10–14 carbon atoms per mole of fatty acid, are substituted in the previous examples.

Basic type oxyalkylation compound of amido derivative of polyamine. Demulsifier Example 1

Materials of the kind described in Amide Examples Nos. 1–12 preceding are treated with one mole of ethylene oxide in the manner previously described, so as to introduce one oxyethyl radical.

Basic type oxyalkylation compound of amido derivative of polyamine. Demulsifier Example 2

The same procedure is followed as in the preceding example, except that more than one oxyalkyl group, or rather, oxyethyl group, is introduced, the preference being to introduce two or three hydroxyethyl groups.

Basic type oxyalkylation compound of amido derivative of polyamine. Demulsifier Example 3

Propylene oxide is substituted for ethylene oxide in Examples 1 and 2 preceding.

Basic type oxyalkylation compound of amido derivative of polyamine. Demulsifier Example 4

Glycid is substituted for ethylene oxide in Examples 1 and 2 preceding.

Oxyalkylation derivatives of polyamine, Example 1

Suitable quantities of diethylene triamine is treated with ethylene oxide in various amounts so as to introduce 1, 2, and 3 hydroxyethyl groups. The temperature employed is approximately 180–240°, and the catalyst is preferably sodium methylate in amounts varying from ½% to 1½%.

Oxyalkylation derivatives of polyamine, Example 2

Triethylene tetramine is substituted for diethylene triamine in Example 1.

Oxyalkylation derivatives of polyamine, Example 3

Tetraethylene pentamine is substituted for diethylene triamine in Example 1.

Oxyalkylation derivatives of polyamine, Example 4

Pentaethylene hexamine is substituted for diethylene triamine in Example 1.

Basic type acylation derivative of oxyalkylated polyamine. Demulsifier Example 5

A material of the kind described in Oxyalkylation Derivatives of Polyamine, Example 1, is acylated in the same manner in which amides are obtained in Amide Examples 1–12, previously described.

Basic type acylation derivative of oxyalkylated polyamine. Demulsifier Example 6

A material of the kind described in Oxyalkylation Derivatives of Polyamine, Example 2, is acylated in the same manner in which amides are obtained in Amide Examples 1–12, previously described.

Basic type acylation derivative of oxyalkylated polyamine. Demulsifier Example 7

A material of the kind described in Oxyalkylation Derivatives of Polyamine, Example 3, is acylated in the same manner in which amides are obtained in Amide Examples 1–12, previously described.

Basic type acylation derivative of oxyalkylated polyamine. Demulsifier Example 8

A material of the kind described in Oxyalkylation Derivatives of Polyamine, Example 4, is acylated in the same manner in which amides are obtained in Amide Examples 1–12, previously described.

Basic type re-acylated oxyalkylation compound of amido derivative of polyamine. Demulsifier Example 9

Materials of the kind exemplified by demulsifiers 1–4 preceding, which have been designated for convenience as "Basic type oxyalkylation compound of amido derivative of polyamine," i. e., prepared by converting the polyamine into an amide and then subjecting the same to oxyalkylation, may, of course, be re-acylated or acylated further so as to introduce acyl groups of the kind described. Under such circumstances one invariably obtains the mixed type, i. e., the ester-amide type, provided that there has been total oxyalkylation. Excellent demulsifiers are obtained by such process, i. e., the re-acylation or second acylation of materials of the kind exemplified by demulsifiers 1–4 inclusive, and particularly when such re-acylation takes place by means of detergent-forming acids, which, in the preferred form, are illustrated by fatty acids, and more particularly, by the hydroxylated fatty acid type. The preferred member of this type, in the present instance, as in other instances, is ricinoleic acid.

It is to be understood that the invention herein contemplated is concerned with the use of a particular type of material, compound or compounds, as a demulsifying agent, and is not concerned with the particular means or method employed in the manufacture of said material, compound or compounds. The methods previously described are those which are most readily employed and which have been most completely described in the manufacturing art pertaining to such compounds. However, as will be readily apparent to a skilled chemist, other manufacturing procedures may be conveniently employed. One might employ an alkyl dichloride and a hydroxylated amine, such as mono-ethanol amine to yield a suitable polyamine.

In certain instances the other reactants might be employed, or else reactants of the kind previously described might be combined in some other manner. It is not intended that the hereto appended claims be limited in any manner whatsoever as to the method of manufacture, unless such method is specifically recited.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

It is to be noted that the compounds described are basic in character, due to the presence of an unacylated basic amino nitrogen atom, or due to the presence of an esterified group of the kind described. In such instances the compound may be employed as such, or may be employed in basic form (i. e., after combination with water), or may be employed in salt form by reaction with an acid such as acetic acid, lactic acid, hydrochloric acid, or any other suitable acid. We prefer the type where at least one strongly basic nitrogen atom is present, and more especially where two such atoms are present.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification or calcareous oil-bearing strata, especially if suspended in or dissolved in the acid employed for acidification.

Attention is directed to the fact that the word "amidification" has been applied to the reaction involving the replacement of an amino hydrogen atom by an acyl radical without conventional limitation to a reaction involving ammonia. The replacement of the amino hydrogen atom of a primary amine or a secondary amine by an acyl radical has been considered as being amidification, rather than the formation of a substituted amide or the formation of an imide or substituted imide. Such obvious departure from conventional nomenclature has been for purposes of simplicity and to show the similarity between certain reactions.

Having thus described our invention, what we claim as new and desire to secure by Letters Patent is:

1. A process for breaking petroleum emulsions of the water-in-oil type, characterized by subjecting the emulsion to the action of a demulsifier consisting of a basic type acylated polyamine of the following formula:

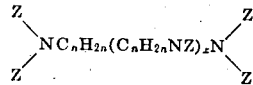

in which $n$ represents a small whole number varying from 2 to 10; $x$ is a small whole number varying from 1 to 10; Z is a member of the class consisting of H, RCO, R'CO, and D, in which RCO represents an acyl radical derived from a higher molecular weight carboxy acid; R'CO is an acyl radical derived from a lower molecular weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) acyloxyalkylene radical in which the acyl group is RCO; and (b) joint occurrence of an amido radical in which the acyl group is RCO and a hydroxyalkyl radical.

2. A process for breaking petroleum emulsions of the water-in-oil type, characterised by subjecting the emulsion to the action of a demulsifier consisting of a basic type acylated hydroxy polyalkylene polyamine, in which the alkylene radical contains at least 2 and not more than 10 carbon atoms; in which the number of amino nitrogen atoms is at least 3 and not more than 12; and there is present at least one acyl radical derived from a higher molecular weight carboxy acid.

3. A process for breaking petroleum emulsions of the water-in-oil type, characterized by subjecting the emulsion to the action of a demulsifier consisting of a strongly basic type acylated hydroxy polyalkylene polyamine, in which the alkylene radical contains at least 2 and not more than 10 carbon atoms; in which the number of amino nitrogen atoms is at least 3 and not more than 12; and there is present at least one acyl radical derived from a higher molecular weight carboxy acid.

4. A process for breaking petroleum emulsions of the water-in-oil type, characterized by subjecting the emulsion to the action of a demulsifier consisting of a strongly basic type acylated hydroxy polyalkylene polyamine, in which the alkylene radical contains at least 2 and not more than 10 carbon atoms; in which the number of amino nitrogen atoms is at least 3 and not more than 12; and there is present at least one acyl radical derived from a detergent-forming monocarboxy acid.

5. A process for breaking petroleum emulsions of the water-in-oil type, characterized by subjecting the emulsion to the action of a demulsifier consisting of a strongly basic type acylated hydroxy polyethylene polyamine; in which the number of amino nitrogen atoms is at least 3 and not more than 12; and there is present at least one acyl radical derived from a detergent-forming monocarboxy acid.

6. A process for breaking petroleum emulsions of the water-in-oil type, characterized by subjecting the emulsion to the action of a demulsifier consisting of a strongly basic type acylated hydroxy polyethylene polyamine; in which the number of amino nitrogen atoms is at least 3 and not more than 12; and there is present at least one acyl radical derived from a fatty acid having at least 8 and not more than 32 carbon atoms.

7. A process for breaking petroleum emulsions of the water-in-oil type, characterized by subjecting the emulsion to the action of a demulsifier consisting of a strongly basic type acylated hydroxy polyethylene polyamine; in which the number of amino nitrogen atoms is at least 3 and not more than 12; and there is present at least one acyl radical derived from an unsaturated fatty acid having at least 8 and not more than 32 carbon atoms.

8. A process for breaking petroleum emulsions of the water-in-oil type, characterized by subjecting the emulsion to the action of a demulsifier consisting of a strongly basic type acylated hydroxy polyethylene polyamine; in which the number of amino nitrogen atoms is at least 3 and not more than 6; and there is present at least one acyl radical derived from an unsaturated fatty acid having at least 8 and not more than 32 carbon atoms.

9. A process for breaking petroleum emulsions of the water-in-oil type, characterized by subjecting the emulsion to the action of an acylation derivative of oxy-ethylated triethylene tetramine; said acylated derivative containing at least one strongly basic amino nitrogen radical and at least one ricinoleyl radical.

10. A process for breaking petroleum emulsions of the water-in-oil type, characterized by subjecting the emulsion to the action of an acylation derivative of oxyethylated tetraethylene pentamine; said acylated derivative containing at least one strongly basic amino nitrogen radical and at least one ricinoleyl radical.

11. A process for breaking petroleum emulsions of the water-in-oil type, characterized by subjecting the emulsion to the action of an acylation derivative of oxyethylated pentaethylene hexamine, said acylated derivative containing at least one strongly basic amino nitrogen radical and at least one ricinoleyl radical.

MELVIN DE GROOTE.
CHARLES M. BLAIR, Jr.